(12) United States Patent
Cazalet

(10) Patent No.: US 8,136,771 B2
(45) Date of Patent: Mar. 20, 2012

(54) MODULAR CLAMPING SYSTEM

(76) Inventor: Michael E. Cazalet, Chandler, AZ (US)

( * ) Notice: Subject to any disclaimer, the term of this patent is extended or adjusted under 35 U.S.C. 154(b) by 330 days.

(21) Appl. No.: 12/433,723

(22) Filed: Apr. 30, 2009

(65) Prior Publication Data

US 2009/0271959 A1 Nov. 5, 2009

Related U.S. Application Data

(60) Provisional application No. 61/049,231, filed on Apr. 30, 2008.

(51) Int. Cl.
*F16L 3/08* (2006.01)
(52) U.S. Cl. .............. 248/74.1; 248/58; 248/65
(58) Field of Classification Search ............ 248/74.1, 248/74.4, 58, 62, 65, 67.5, 226.11, 230.1
See application file for complete search history.

(56) References Cited

U.S. PATENT DOCUMENTS

| | | | |
|---|---|---|---|
| 2,151,768 A * | 3/1939 | Humeston | 42/124 |
| 3,042,352 A * | 7/1962 | Stamper | 248/68.1 |
| 3,132,831 A * | 5/1964 | Stamper | 248/68.1 |
| 3,295,806 A * | 1/1967 | Modeme | 248/74.4 |
| 3,305,199 A * | 2/1967 | Bayes et al. | 248/74.1 |
| 4,121,363 A * | 10/1978 | York | 42/127 |
| D291,061 S | 7/1987 | Nakatani | |
| 4,934,635 A | 6/1990 | Sherman | |
| 5,520,139 A | 5/1996 | King et al. | |
| D386,397 S | 11/1997 | Adriaenssens | |
| 5,718,454 A | 2/1998 | Harrod | |
| 5,918,613 A | 7/1999 | Larson | |
| 5,944,365 A | 8/1999 | Kizler et al. | |
| 6,908,107 B2 | 6/2005 | Barth | |
| 6,938,865 B1 | 9/2005 | Day | |
| 7,401,569 B2 | 7/2008 | Jones | |

* cited by examiner

*Primary Examiner* — Anita M King
(74) *Attorney, Agent, or Firm* — Snell & Wilmer L.L.P.

(57) ABSTRACT

Disclosed are modular clamping systems and methods for use. A modular clamping system may be configured to mount a variety of accessories to a portion of tubing. The modular clamping system may utilize multiple strap clamp portions having different clamping diameters in order to mount an accessory to tubing of various diameters.

16 Claims, 8 Drawing Sheets

FIG. 2

MODULAR CLAMPING SYSTEM

CROSS REFERENCE TO RELATED APPLICATIONS

This application is a non-provisional of U.S. Provisional No. 61/049,231 filed on Apr. 30, 2008 and entitled "MODULAR ROLL CAGE ACCESSORY MOUNTING SYSTEM." The entire contents of the foregoing application are hereby incorporated by reference herein.

TECHNICAL FIELD

The present disclosure relates to clamping systems, particularly modular clamping systems configured to mount to tubing of various diameters.

BACKGROUND

Mounting systems, for example clamps, are often limited in the geometry of the object to which they are configured to couple. For example, a particular clamp may be suitable only for coupling to a portion of tubing of a fixed diameter. Thus, multiple clamps may be needed to couple to tubing of various diameters. Further, multiple versions of products intended for coupling to tubing, for example vehicle roll cage accessories, may need to be created in order to accommodate various roll cage tubing diameters. Thus, it remains desirable to provide a modular clamping system.

SUMMARY

This disclosure relates to modular clamping systems and methods related thereto. In an exemplary embodiment, a modular clamping system comprises an inner clamp portion having a mounting groove therein. The mounting groove comprises a first mounting profile. The mounting groove further comprises a second mounting profile deeper than the first mounting profile. A strap clamp portion is configured to couple to the inner clamp portion in the mounting groove thereof. The strap clamp portion is configured to surround and releasably couple to a portion of tubing. A fastener is configured to couple the inner clamp portion to the strap clamp portion.

In another exemplary embodiment, a method for coupling an accessory to a portion of tubing comprises passing a strap clamp portion around the portion of tubing, and coupling the strap clamp portion to an inner clamp portion via a fastener. The inner clamp portion has a mounting groove therein. The mounting groove comprises a first mounting profile. The mounting groove further comprises a second mounting profile deeper than the first mounting profile, and the strap clamp portion initially contacts the first mounting profile. The fastener is tightened to cause the strap clamp portion to deform at least partially toward the second mounting profile.

In yet another exemplary embodiment, a tangible computer-readable medium has instructions stored thereon. The instructions comprise instructions to construct an inner clamp portion having a mounting groove therein. The mounting groove comprises a first mounting profile. The mounting groove further comprises a second mounting profile deeper than the first mounting profile. The instructions further comprise instructions to construct a strap clamp portion configured to couple to the inner clamp portion in the mounting groove thereof. The strap clamp portion is configured to surround and releasably couple to a portion of tubing, and the strap clamp portion is configured to deform at least partially toward the second mounting profile responsive to a force.

The contents of this summary section are provided only as a simplified introduction to the disclosure, and are not intended to be used to limit the scope of the appended claims.

BRIEF DESCRIPTION OF THE DRAWINGS

With reference to the following description, appended claims, and accompanying drawings:

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims.

For the sake of brevity, conventional techniques for fastening, machining, and the like may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical modular clamping system.

Figure 1:
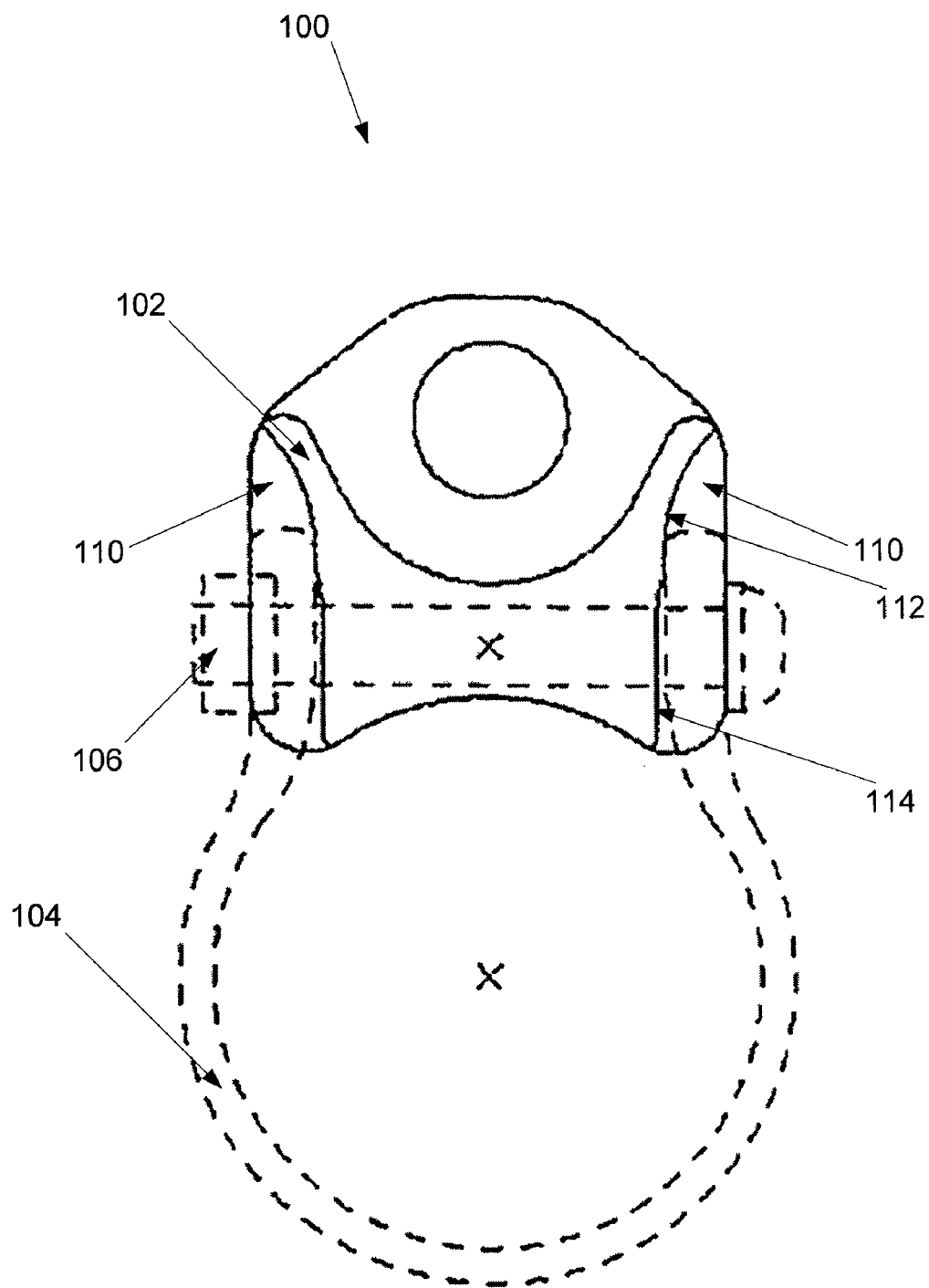
FIG. 1 illustrates a modular clamping system in accordance with an exemplary embodiment of the invention.
Figure 2:
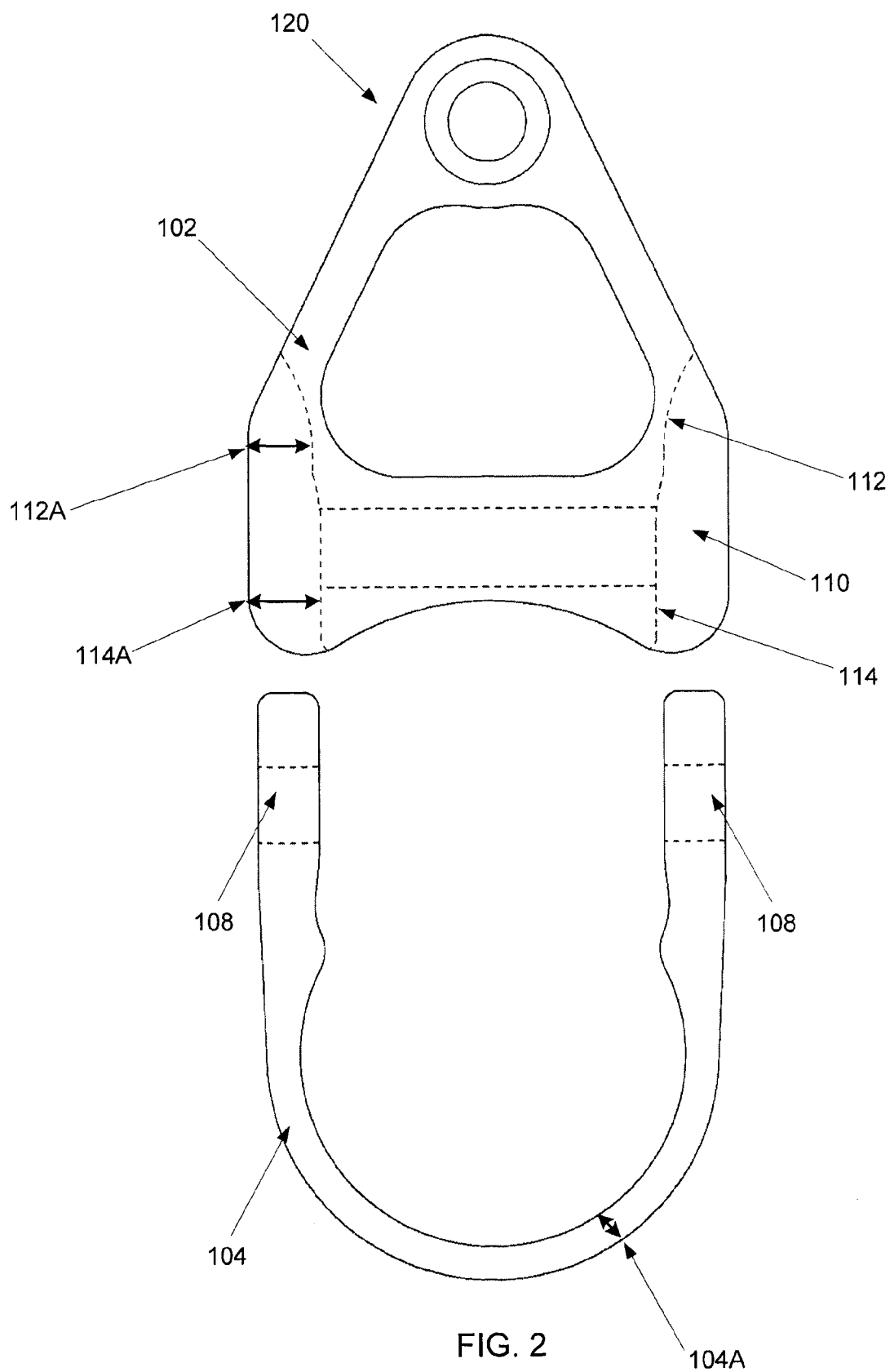
FIG. 2 illustrates an inner clamp portion proximate to a strap clamp portion in accordance with an exemplary embodiment of the invention.
Figure 3:
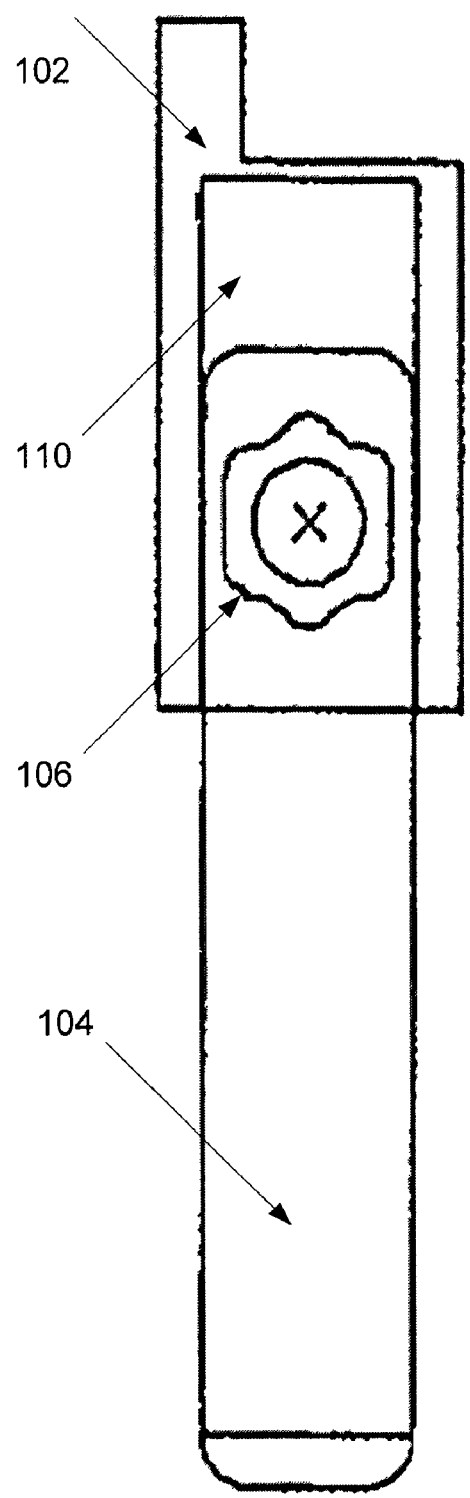
FIG. 3 illustrates a side view of the modular clamping system of FIG. 1 in accordance with an exemplary embodiment of the invention.

With reference now to FIGS. 1-3, in accordance with an exemplary embodiment, a modular clamping system 100 comprises inner clamp portion 102, strap clamp portion 104, and fastener 106. Inner clamp portion 102 comprises at least two mounting grooves 110. Each mounting groove 110 further comprises outer groove profile 112 and inner grove groove profile 114. Inner clamp portion 102 is coupled to strap clamp portion 104 via fastener 106. Inner clamp portion 102 may also be coupled to any suitable object (for example, accessories 120 depicted in FIGS. 5A-5C) desired to be held in place by modular clamping system 100.

Continuing to reference FIGS. 1-3 and in accordance with an exemplary embodiment, inner clamp portion 102 comprises a structure configured to releasably receive strap clamp portion 104. Inner clamp portion 102 may comprise metal (e.g., aluminum, steel, titanium, magnesium, and the like, and/or alloys and combinations of the same), plastic, composite, or any other suitable structural material. Inner clamp portion 102 further comprises at least one mounting groove 110.

With reference now to FIGS. 1-4 and 5A-5C, and in accordance with an exemplary embodiment, inner clamp portion 102 may be coupled to various accessories 120. An accessory 120 may comprise any object desired to be coupled to a portion of tubing, for example a vehicle accessory such as a mirror, an electronic accessory mount, an antenna mount, a light mount, a windshield mount, a license plate mount, a registration sticker mount, a screen mount, and/or the like. In various embodiments, inner clamp portion 102 may be formed from a single piece of material from which an accessory 120 is also formed, for example a single piece of billet aluminum, or any other suitable structural material. Moreover, in various other embodiments, inner clamp portion 102 and strap clamp portion 104 may formed from a single piece of material. Additionally, multiple accessories 120 may be configured at least partially with similar dimensions such that each accessory 120 may be utilized with modular clamping system 100.

Continuing to reference FIGS. 1-3, in various exemplary embodiments, on inner clamp portion 102, a mounting groove 110 is configured to receive an end of strap clamp portion 104. For example, inner clamp portion 102 may comprise two mounting grooves 110 located on opposite sides of inner clamp portion 102. In an exemplary embodiment, a mounting groove 110 is configured as a trench-like shape having at least one sidewall, and having outer groove profile 112 and inner groove profile 114 forming at least a portion of the bottom of the trench. The sidewalls of mounting groove 110 assist strap clamp portion 104 in remaining in a fixed location when coupled to inner clamp portion 102. Moreover, the sidewalls of mounting groove 110 may enable modular clamping system 100 to resist deformation and/or decoupling, particularly in response to forces exerted on inner clamp portion 102 and/or strap clamp portion 104 in a direction substantially perpendicular to a longitudinal axis of mounting groove 110. However, mounting groove 110 may be oriented or otherwise configured in any suitable shape or manner to facilitate coupling of inner clamp portion 102 and strap clamp portion 104. Moreover, mounting groove 110 may comprise any suitable number of groove profiles at the bottom of mounting groove 110 in order to enable strap clamp portion 104 to apply a desired force to a portion of tubing.

In various exemplary embodiments, outer groove profile 112 at least partially defines a first bottom surface of mounting groove 110. Outer groove profile 112 may begin at an edge of mounting groove 110 located proximate to accessory 120. Moreover, outer groove profile 112 may extend at least partway along a bottom surface of mounting groove 110. In an exemplary embodiment, outer groove profile 112 is about half the length of mounting groove 110. However, outer groove profile 112 may be configured with any suitable length, width, depth, and/or other dimension to enable inner clamp portion 102 to couple with strap clamp portion 104. Outer groove profile 112 may define a flat planar surface, a curvilinear surface, a stepped surface, a textured surface, and/or any other suitable surface configured to allow inner clamp portion 102 to releasably couple to strap clamp portion 104.

In an exemplary embodiment, inner groove profile 114 at least partially defines a second bottom surface of mounting groove 110. Inner groove profile 114 may have at least one common edge with outer groove profile 112. Inner groove profile 114 may begin at least partway along mounting groove 110, and may extend to the end of mounting groove 110 located proximate to strap clamp portion 104. In an exemplary embodiment, inner groove profile 114 is about half the length of mounting groove 110. Moreover, inner groove profile 114 may be configured with any suitable length, width, depth, and/or other dimension to enable strap clamp portion 104 to deform at least partially towards inner clamp portion 102 responsive to a force applied by and/or associated with fastener 106.

In various exemplary embodiments, inner groove profile 114 is deeper than the corresponding outer groove profile 112. With momentary reference to FIG. 2, as used herein, inner groove profile 114 is "deeper" than corresponding outer groove profile 112 because the distance from the top of mounting groove 110 to a surface of outer groove profile 112 (as represented by distance 112A) is smaller than the distance from the top of mounting groove 110 to a surface of inner groove profile 114 (as represented by distance 114A). Stated another way, mounting groove 110 is deeper along inner groove profile 114, inner clamp portion 102 is narrower between opposing inner groove profiles 114, and so on. In this manner, strap clamp portion 104 is provided with clearance to deform responsive to a force, for example a force applied by and/or associated with fastener 106, and thus strap clamp portion 104 may exert a greater compressive force on a portion of tubing than if strap clamp portion 104 was not provided with clearance to deform. In this manner, modular clamping system 100 may be held more securely in place when coupled to a portion of tubing.

With reference now to FIGS. 1 and 3, and in accordance with an exemplary embodiment, fastener 106 comprises a structure configured to releasably couple inner clamp portion 102 and strap clamp portion 104 to one another. Fastener 106 may comprise a bolt and/or nut, a screw, and/or the like. Moreover, fastener 106 may comprise a threaded portion configured to engage corresponding threads within inner clamp portion 102 and/or strap clamp portion 104. Further, fastener 106 may comprise any suitable structure configured to apply a force to inner clamp portion 102 and/or strap clamp portion 104.

As strap clamp portion 104 and inner clamp portion 102 are coupled, an end of strap clamp portion 104 initially contacts outer groove profile 112. In this manner, inner clamp portion 102 may be brought into contact with strap clamp portion 104. Fastener 106 is then passed through a hole in inner clamp portion 102 and corresponding holes 108 in strap clamp portion 104. As fastener 106 is tightened, strap clamp portion 104 may be deformed at least partially toward and/or at least partially brought into contact with inner groove profile 114, allowing strap clamp portion 104 to apply a desired retaining force to a portion of tubing. In this manner, strap claim portion 104 may be securely coupled to the tubing it surrounds as well as to inner clamp portion 102.

Figure 4:
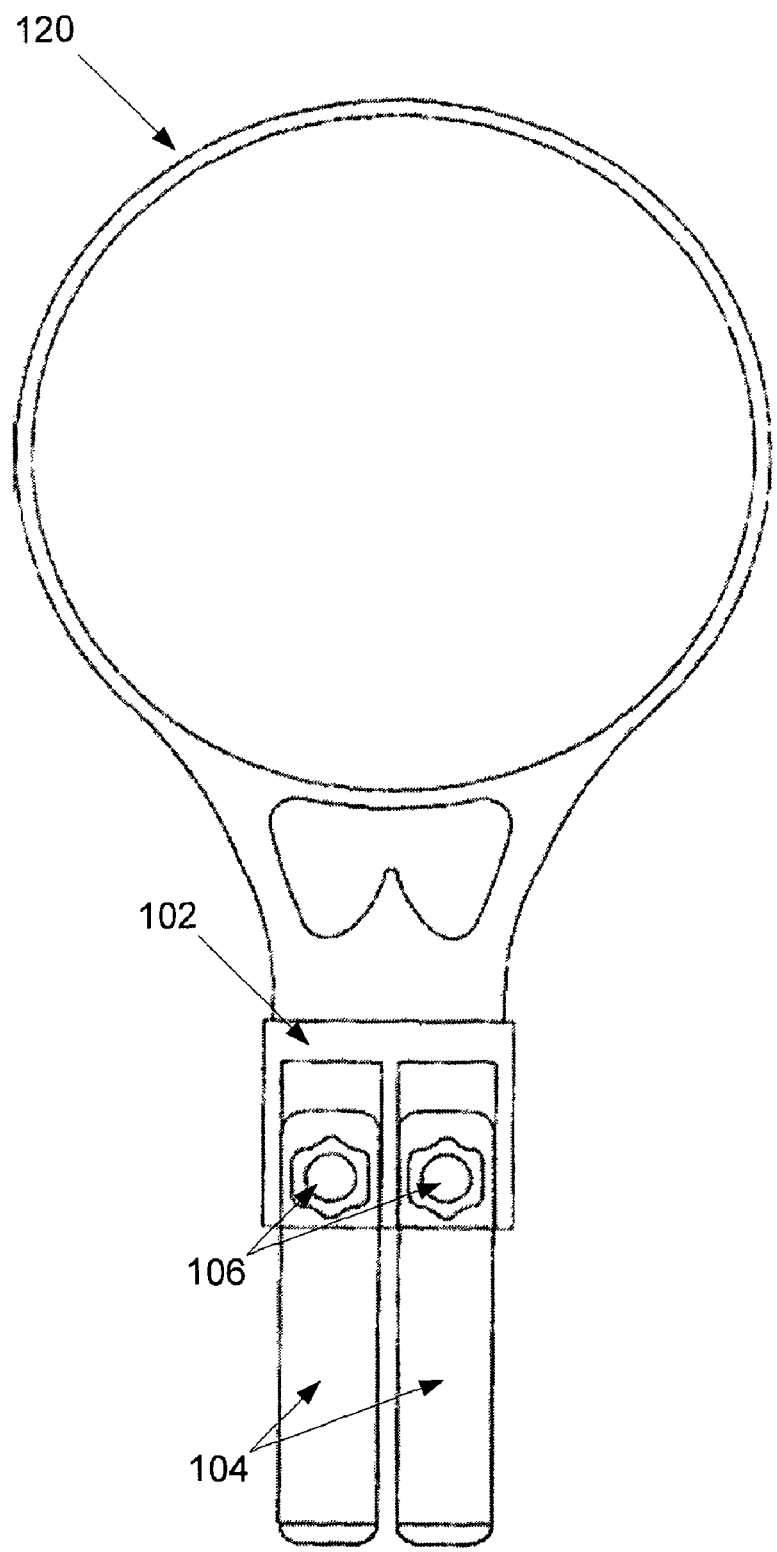
FIG. 4 illustrates use of multiple strap clamp portions in accordance with an exemplary embodiment of the invention.

With reference now to FIG. 4, in an exemplary embodiment, inner clamp portion 102 is configured to couple with two strap clamp portions 104. Inner clamp portion 102 is thus configured with a corresponding number of mounting grooves 110, e.g., four mounting grooves 110. Moreover, inner clamp portion 102 may be configured to couple with an additional number of strap clamp portions 104. In this manner, an accessory 120 (particularly a large and/or heavy accessory 120, and/or an accessory 120 subject to significant external forces) may be coupled to a portion of tubing in a more secure manner than would be possible via use of a single strap clamp portion 104.

Returning now to FIGS. 1-3, in accordance with an exemplary embodiment, strap clamp portion 104 comprises a structure configured to be placed around a portion of structural tubing, for example vehicle roll cage tubing. Strap clamp portion 104 may comprise metal (e.g., aluminum, steel, titanium, magnesium, and the like, and/or alloys and combinations of the same), plastic, composite, or any other suitable structural material. In certain embodiments, strap clamp portion 104 may be formed from a single piece of material, for example a single piece of aluminum. In various exemplary embodiments, strap clamp portion 104 is configured with a predetermined and/or uniform clamp width, allowing a strap clamp portion 104 to couple with an inner clamp portion 102. Strap clamp portion 104 is further configured with a suitable clamping diameter configured to couple with a particular portion of tubing. Moreover, multiple strap clamp portions 104, each having a different clamping diameter, may be provided, in order to enable modular clamping system 100 to couple with tubing of various diameters. For example, a first strap clamp portion 104 may be configured with a clamping diameter of about two inches, a second strap clamp portion 104 may be configured with a slightly larger clamping diameter, e.g., of about two and one-sixteenth inches, a third strap clamp portion 104 may be configured with a clamping diameter slightly larger than that of the second strap clamp portion, e.g., about two and one-eighth inches, and so on. In this manner, a particular strap clamp portion 104 may be suited for clamping to tubing of a corresponding diameter.

In various exemplary embodiments, and with momentary reference to FIG. 2, strap clamp portion 104 may be configured with a low profile, e.g., with a thickness 104A, such that that a portion of strap clamp portion 104 is unobtrusive when coupled to a portion of structural tubing and/or so that a portion of strap clamp portion 104 does not protrude excessively above the surface of the tubing. However, strap clamp portion 104 may be configured with any appropriate shapes, dimensions, thicknesses, and so forth, in order to allow strap clamp portion 104 to securely couple to a portion of tubing. Moreover, strap clamp portion 104 may be configured to be substantially rigid, or in other embodiments, to be flexible so that strap clamp portion 104 may be flexed, stretched, and/or otherwise temporarily deformed in order to snap around or otherwise at least partially surround a portion of tubing.

In an exemplary embodiment, strap clamp portion 104 further comprises one or more holes 108 in the ends of strap clamp portion 104. Holes 108 are configured to be substantially perpendicular to the bore of strap clamp portion 104. In this manner, a fastener, for example fastener 106, may be coupled to both ends of strap clamp portion 104, and strap clamp portion 104 may thus be tightened around a portion of tubing, coupled to inner clamp portion 102, and/or the like.

Figure 5A:
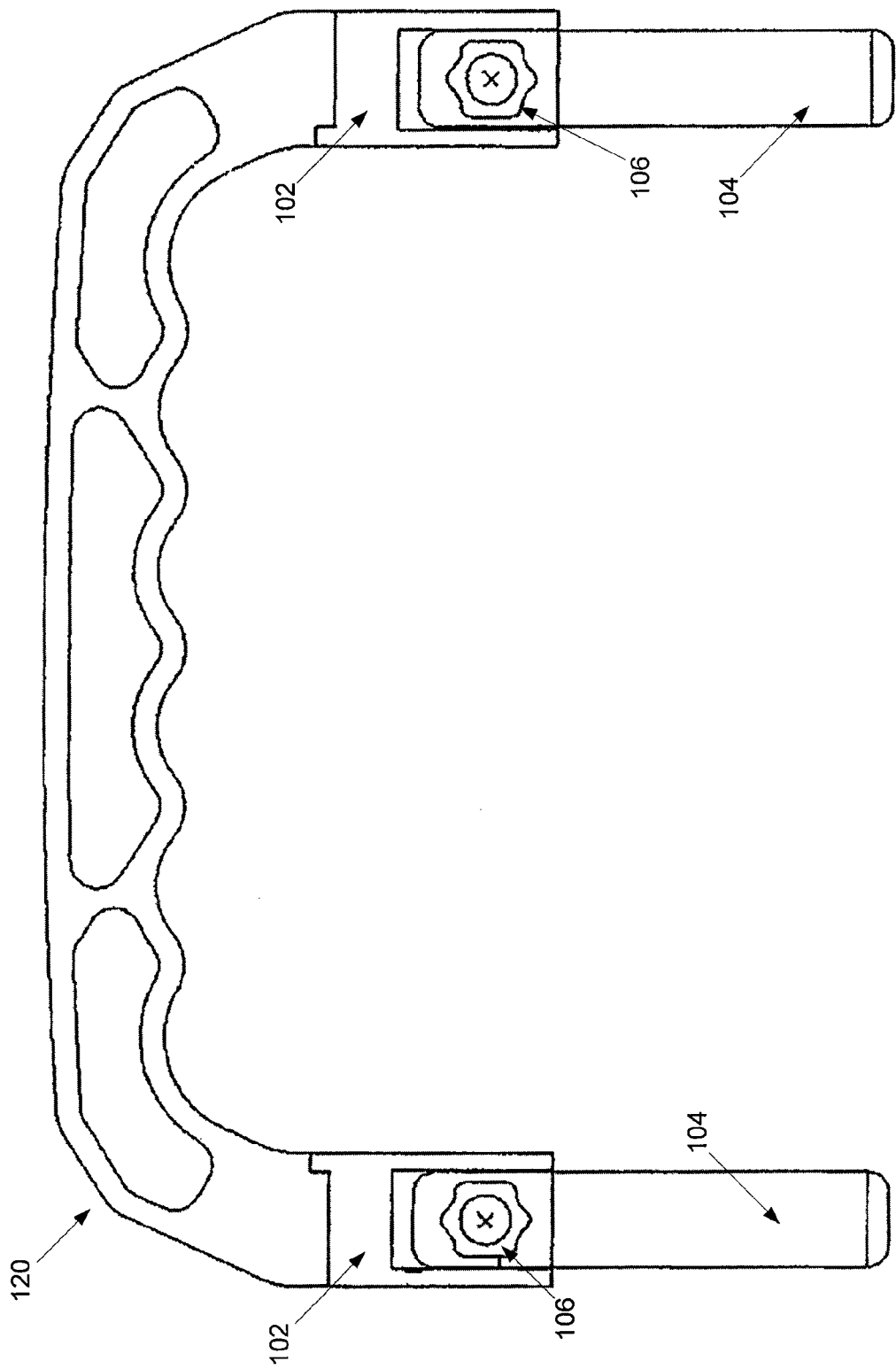
FIGS. 5A through 5C illustrate use of a modular clamping system in connection with various vehicle accessories in accordance with an exemplary embodiment of the invention.
Figure 5B:
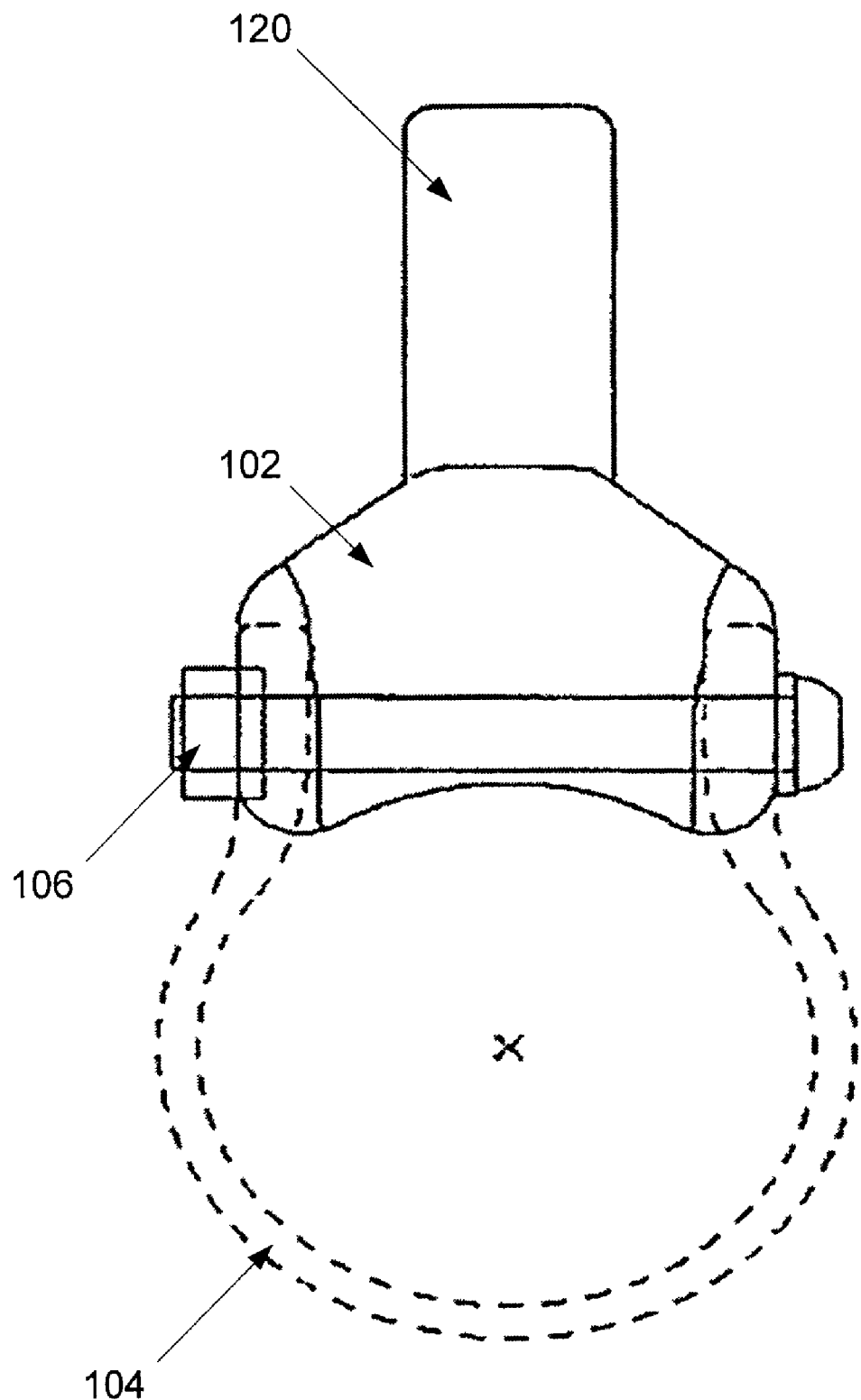
Figure 5C:
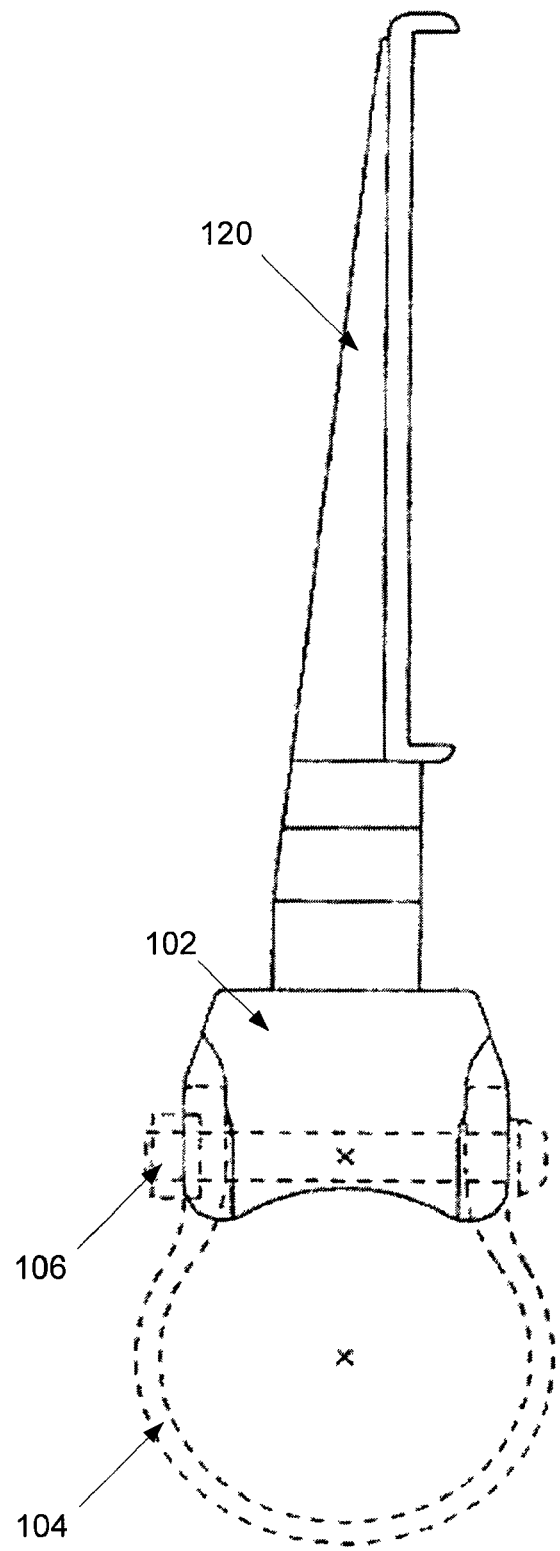

With reference now to FIG. 5A, an accessory 120 may be coupled to multiple modular clamping systems 100. Moreover, a modular clamping system 100 may be coupled to multiple accessories 120. As noted previously, a modular clamping system 100 may comprise a single strap clamp portion 104 and/or multiple strap clamp portions 104, as appropriate. Moreover, because a particular accessory 120 may be coupled to an inner clamp portion 102 configured with a fixed clamping width, a user may move the particular accessory 120 from a first mounting location (e.g., on a portion of tubing having a first diameter) to a second mounting location (e.g., on a portion of tubing having a second diameter different from the first diameter) merely by changing the selected strap clamp portion 104 used to couple with inner clamp portion 102. Due to this interchangeable, modular design of modular clamping system 100, a user may ensure re-usability and non-obsolescence of a purchased accessory 120, even if they utilize a particular accessory 120 on, for example, a new vehicle having a different tubing diameter. In this manner, an end-user can avoid unnecessary purchases of additional clamping systems and/or accessories.

Figure 6:
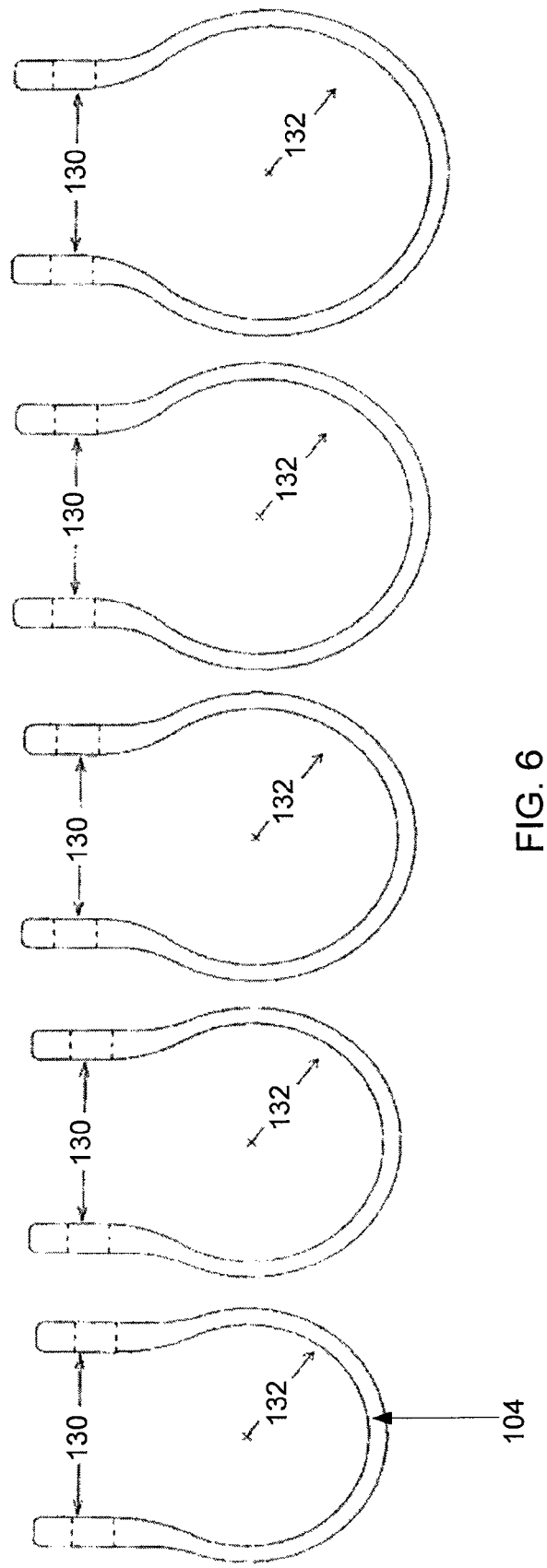
FIG. 6 illustrates a series of strap clamp portions having varied clamp diameter in accordance with an exemplary embodiment of the invention.

As illustrated in FIG. 6, in various exemplary embodiments, modular clamping system 100 is configured with multiple strap clamping portions 104 having a uniform clamping width 130 and variable clamp diameters 132. In this manner, any suitable object (for example, a vehicle accessory) may be mounted to a portion of tubing using any inner clamp portion 102, regardless of the clamp diameter 132 of a corresponding strap clamp portion 104.

As will be appreciated by one of ordinary skill in the art, principles of the present disclosure may be reflected in a computer program product on a tangible computer-readable, storage medium having computer-readable program code means embodied in the storage medium. Any suitable computer-readable storage medium may be utilized, including magnetic storage devices (hard disks, floppy disks, and the like), optical storage devices (CD-ROMs, DVDs, Blu-Ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks. The computer program instructions may also be loaded onto a manufacturing machine, such that the instructions, when executed by the manufacturing machine, cause the manufacturing machine to form an article of manufacture in accordance with principles of the present disclosure.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims, In the foregoing specification, the invention has been described with reference to various embodiments. However, one of ordinary skill in the art appreciates that various modifications and changes can be made without departing from the scope of the present invention as set forth in the claims below. Accordingly, the specification is to be regarded in an illustrative rather than a restrictive sense, and all such modifications are intended to be included within the scope of the present invention. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection. When "at least one of A, B, or C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A modular clamping system, comprising:
    an inner clamp portion having a mounting groove therein, wherein the mounting groove comprises a first mounting profile, and wherein the mounting groove further comprises a second mounting profile deeper than the first mounting profile;
    a strap clamp portion configured to couple to the inner clamp portion in the mounting groove thereof, wherein the strap clamp portion is configured to surround and releasably couple to a portion of tubing; and
    a fastener configured to couple the inner clamp portion to the strap clamp portion,
    wherein the strap clamp portion is configured to deform responsive to a force associated with the fastener, and wherein the deformed strap clamp portion does not contact at least a portion of the second mounting profile.

2. The modular clamping system of claim 1, wherein the inner clamp portion is configured to couple to at least two strap clamp portions.

3. The modular clamping system of claim 2, wherein the at least two strap clamp portions have a uniform clamping width.

4. The modular clamping system of claim 3, wherein the at least two strap clamp portions have different clamping diameters.

5. The modular clamping system of claim 1, wherein the strap clamp portion is configured to deform to come in contact with at least a portion of the second mounting profile responsive to a force associated with the fastener.

6. The modular clamping system of claim 1, wherein the strap clamp portion compressively couples to the tubing responsive to a force associated with the fastener.

7. The modular clamping system of claim 1, further comprising a vehicle accessory coupled to the inner clamp portion.

8. The modular clamping system of claim 7, wherein the vehicle accessory and the inner clamp portion comprise a single piece of billet aluminum.

9. The modular clamping system of claim 1, wherein the mounting groove comprises a trench-like shape having at least one sidewall.

10. The modular clamping system of claim 9, wherein the sidewall resists decoupling of the strap clamp portion and the inner clamp portion responsive to a force exerted in a direction perpendicular to a longitudinal axis of the mounting groove.

11. The modular clamping system of claim 1, wherein the second mounting profile has at least one common edge with the first mounting profile.

12. The modular clamping system of claim 1, wherein the second mounting profile extends to the end of the mounting groove proximate the strap clamp portion.

13. A method for coupling an accessory to a portion of tubing, the method comprising:
    passing a strap clamp portion around the portion of tubing;
    coupling the strap clamp portion to an inner clamp portion via a fastener, wherein the inner clamp portion has a mounting groove therein, wherein the mounting groove comprises a first mounting profile, wherein the mounting groove further comprises a second mounting profile deeper than the first mounting profile, and wherein the strap clamp portion initially contacts the first mounting profile; and
    tightening the fastener to cause the strap clamp portion to deform at least partially toward the second mounting profile,
    wherein the inner clamp portion comprises at least four mounting grooves, and
    wherein passing a strap clamp portion around the portion of tubing further comprises passing at least two strap clamp portions around the portion of tubing.

14. The method of claim 13, wherein the deformed strap clamp portion does not contact at least a portion of the second mounting profile.

15. The method of claim 13, wherein each of the at least four mounting grooves comprises a trench-like shape having at least one sidewall.

16. The method of claim 15, wherein each sidewall resists decoupling of the inner clamp portion from one of the at least two strap clamp portions responsive to a force exerted in a direction perpendicular to a longitudinal axis of the respective mounting groove.

* * * * *